(12) United States Patent
Byrd et al.

(10) Patent No.: US 7,395,904 B2
(45) Date of Patent: Jul. 8, 2008

(54) DISC BRAKE

(75) Inventors: Christopher Byrd, Elkhart, IN (US); John Clark, Granger, IN (US)

(73) Assignee: Robert Basoh GmbH, Stutgartt (DE)

( * ) Notice: Subject to any disclaimer, the term of this patent is extended or adjusted under 35 U.S.C. 154(b) by 153 days.

(21) Appl. No.: 11/306,234

(22) Filed: Dec. 20, 2005

(65) Prior Publication Data

US 2007/0137951 A1   Jun. 21, 2007

(51) Int. Cl.
*F16D 55/14* (2006.01)
*F16D 55/46* (2006.01)
*F16D 55/26* (2006.01)
*F16D 55/08* (2006.01)
*B60T 1/00* (2006.01)

(52) U.S. Cl. .................. 188/72.2; 188/72.6; 188/72.7; 188/28

(58) Field of Classification Search ............ 188/72.2, 188/72.6, 72.9, 72.7, 28
See application file for complete search history.

(56) References Cited

U.S. PATENT DOCUMENTS

| | | | | |
|---|---|---|---|---|
| 3,096,853 A | * | 7/1963 | Farrand | 188/18 R |
| 3,113,643 A | | 12/1963 | Botterill | |
| 3,185,259 A | * | 5/1965 | Chouings | 188/71.7 |
| 3,349,872 A | * | 10/1967 | Brueder | 188/72.9 |
| 3,465,849 A | * | 9/1969 | Bernfeld et al. | 188/71.9 |
| 3,744,596 A | * | 7/1973 | Sander | 188/203 |
| 3,791,491 A | * | 2/1974 | Tickle | 188/70 R |
| 3,986,584 A | * | 10/1976 | Wright et al. | 188/71.8 |
| 4,121,697 A | * | 10/1978 | Kobelt et al. | 188/72.7 |
| 4,393,962 A | * | 7/1983 | Kobelt | 188/72.6 |
| 4,457,408 A | * | 7/1984 | Montalvo, III | 188/72.2 |
| 4,572,335 A | * | 2/1986 | Kobelt | 188/72.1 |
| 4,621,713 A | | 11/1986 | Carre et al. | |
| 5,249,648 A | | 10/1993 | Bejot et al. | |
| 5,819,884 A | | 10/1998 | Giering | |
| 6,488,132 B2 | | 12/2002 | Matsuishi | |
| 6,502,671 B2 | | 1/2003 | Hayford et al. | |
| 6,962,244 B2 | | 11/2005 | Ortegren et al. | |

* cited by examiner

*Primary Examiner*—Robert A. Siconolfi
*Assistant Examiner*—Mahbubur Rashid
(74) *Attorney, Agent, or Firm*—Leo H McCormick, Jr.; Sarah Taylor

(57) ABSTRACT

An actuator arrangement for a disc brake for moving first and second friction members into engagement with a rotor and effect a brake application. The actuator arrangement includes first and second levers that are pivotally connected to an anchor located in a plane that is perpendicular to first and second rails on which the first and second friction member are retained, a third lever that is connected to the first lever and a yoke to receive a second end of the second lever and align a first ramp surface thereon with a second ramp surface on its end and an input linkage. The input linkage receives an input force and moves on the first and second ramp surfaces to pull on the first lever and push on the second lever to move the first and second friction members into engagement with the rotor to effect a brake application.

9 Claims, 3 Drawing Sheets

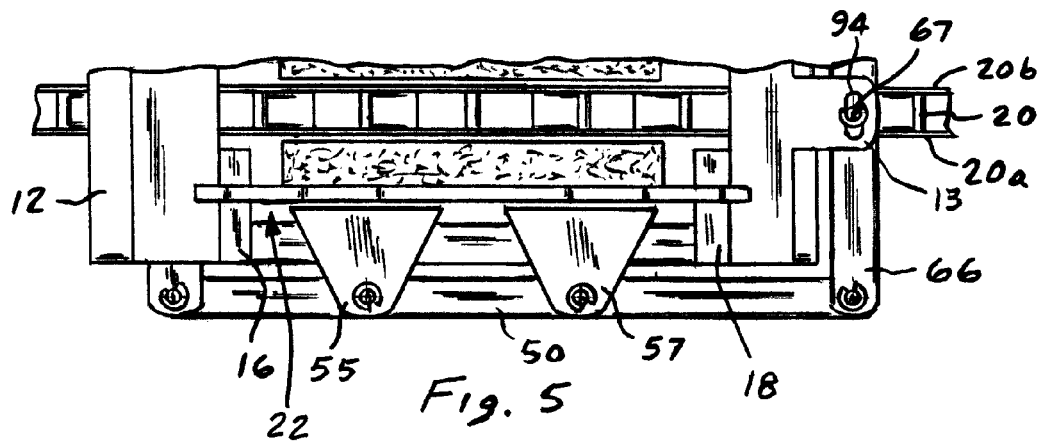
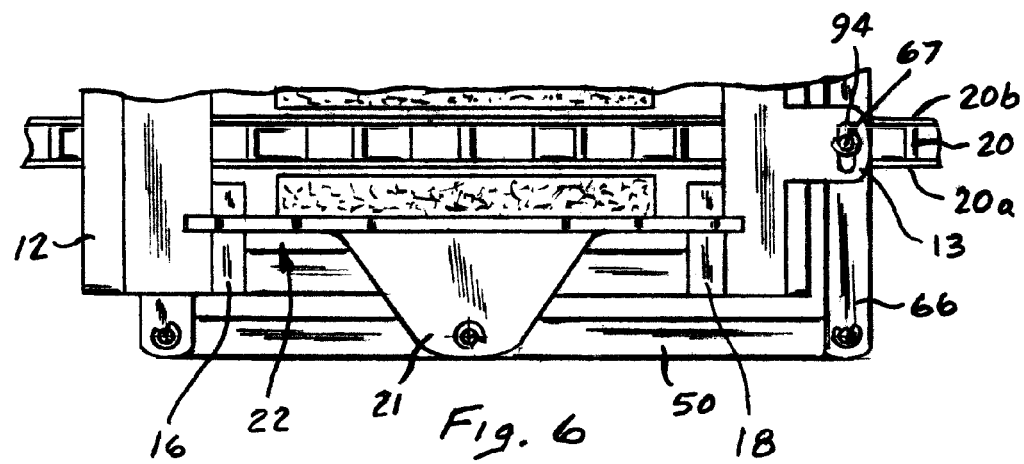
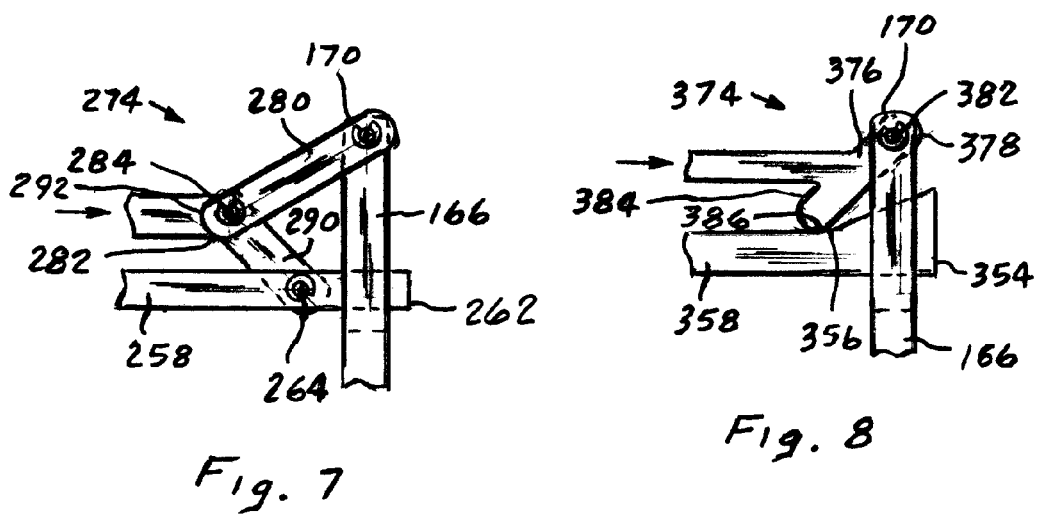

DISC BRAKE

This invention relates to a disc brake and in particular an actuation arrangement defined by first and second levers pivotally retained on an anchor and connected to each other through a third lever such that a an input force applied through an input linkage simultaneously moves first and second friction members into engagement with a rotor to effect a brake application.

BACKGROUND OF THE INVENTION

Disc brakes normally use first and second guide pins that are retained in first and second bores in a support member that is fixed to the frame of a vehicle. In such disc brakes, the support member receives the spaced apart first and second guide pins to allow the caliper to slide and allow corresponding first and second friction pads to engage with a rotor to effect a brake application. The following U.S. Pat Nos. 5,526,904; 5,749,445; 5,810,122; 5,934,416 and 6,454,056 may be considered typical of such disc brakes. Basically during a brake application, the first and second guide pins slide in the first and second bores as a reaction to a force developed by pressurized fluid being presented to an actuation chamber that acts on an actuation piston to directly move the first friction member toward a rotor. The reaction force is received by the caliper and as a result moves a second friction member toward and into engagement with the rotor during the brake application. On termination the presentation of pressurized fluid to the actuation chamber, the first and second friction members move away from the rotor to establish a running clearance. In such disc brakes the caliper is a component that adds considerable weight to the disc brake in addition for a need to easily slide toward and away from the rotor. If either the first or second friction members do not move away from the rotor brake, drag occurs which can cause undesirable wear of both the friction members and rotor. It is known to utilize the resiliency of a seal associated with the actuation piston to assist in the moving the first friction member away from the rotor. Unfortunately, the second friction member is not directly moved away from the rotor but must rely on knock back by the rotor to eliminate brake drag. Brake manufacturers have attempted to reduce brake drag by developing low slide force calipers, however, the components of current disc brakes require tight tolerance to maintain desired operational capabilities. If such tolerances are not maintained, a perpendicular relationship between the guide pins and rotor is not achieved and caming can occur that causes pin binding that can result in high slide forces. It has been suggested that slide forces could be reduced by increasing the clearance tolerance between the guide pins and bores in the fixed support to provide for a free sliding structure. Evaluation of this type structure indicated that noise was created as the pins rattled in the bores when the vehicle traveled on a road having an uneven surface. Rubber insulators that surrounded the guide pins were added to attenuate the noise created by the rattle, unfortunately, this solution reduced the free sliding ability of the caliper and as a result did not completely solve the problem.

It had been disclosed in U.S. Pat Nos. 3,113,643, 4,155,431, and 6,000,506 that the caliper could remain stationary by locating pistons one both sides of the rotor that move the friction members into engagement with a rotor to effect a brake application.

When disc brakes are used for large trucks it has been disclosed that an actuator may include a wedge member such as disclosed in U.S. Pat. No. 5,249,648. This structure functions in an adequate manner but has not been adaptable for use in automobiles.

SUMMARY OF THE INVENTION

A primary object of the present invention is to provide a disc brake with an actuator arrangement essentially consisting of parallel first and second levers that pivotally retained on an anchor and joined together by a third lever through which an input force is applied to the third lever and second lever by a wedge to moves the first and second levers and correspondingly first and second friction member into engagement with a rotor to effect a brake application.

In more particular detail, the disc brake of this invention has an anchor that is fixed to a support member of a vehicle to position first and second parallel rails thereon in perpendicular alignment with a rotor. A first friction member is retained between the first and second rails and located adjacent a first face of the rotor. A second friction member is retained between the first and second rails and located adjacent a second face of the rotor. An actuator arrangement acts on and respectively moving the first and second friction members into engagement with the first and second faces on the rotor to effect a brake application. The first lever of the actuator arrangement has a first end that is pivotally connected to the anchor while a second end extends along a plane that is substantially perpendicular to the first and second rails such that a contact member that is secured to the first lever is aligned with the first friction member. Similarly, the second lever of the actuator arrangement has a first end that is pivotally connected to the anchor and a second end that extends along a plane that is substantially perpendicular to the first and second rails such that a second contact member that is secured to the second lever is aligned with the second friction member. The second end of the second lever has a first ramp surface thereon that is aligned in a plane that extends away from the rotor. The third lever has a first end that is pivotally connected to the second end of the first lever and a second end with a yoke thereon through which the second lever extends and is aligned with a second ramp surface attached to the yoke such that second ramp surface is located in a plane that extends toward the rotor. The wedge engages the first and second ramp surfaces and responds to an input force by moving on the first and second ramp surfaces such that the first lever is pulled by the third lever and pivots about its first end to move the first friction member by way of the first contact member into engagement with the first face of the rotor and the second lever is pushed to pivot about its first end to move the second friction member by way of the second contact member into engagement the second face of the rotor to effect a brake application.

An advantage of this disc brake results in a simple lever arrangement for moving first and second friction members into engagement with a rotor to effecet a brake application.

An object of this invention is to provide a disc brake having first and second parallel lever arms through which an input force is applied through first and second contacts member to move first and second friction members into engagement with a rotor to effect a brake application and maintain a substantially balanced wear of the first and second friction members.

BRIEF DESCRIPTION OF THE DRAWINGS

FIG. 5 is a view of a secondary embodiment of the contact member through which an input is applied from a lever into a friction member;

FIG. 6 is a view of a lever and friction member wherein a reaction force is carried into the anchor through the lever;

FIG. 7 is a schematic illustration of another embodiment of an input link through which an actuation force may be applied to effect a brake application; and FIG. 8 is a schematic illustration of a still a further embodiment of an input link through which an actuation force may be applied to effect a brake application.

DETAILED DESCRIPTION OF THE INVENTION

Figure 1:
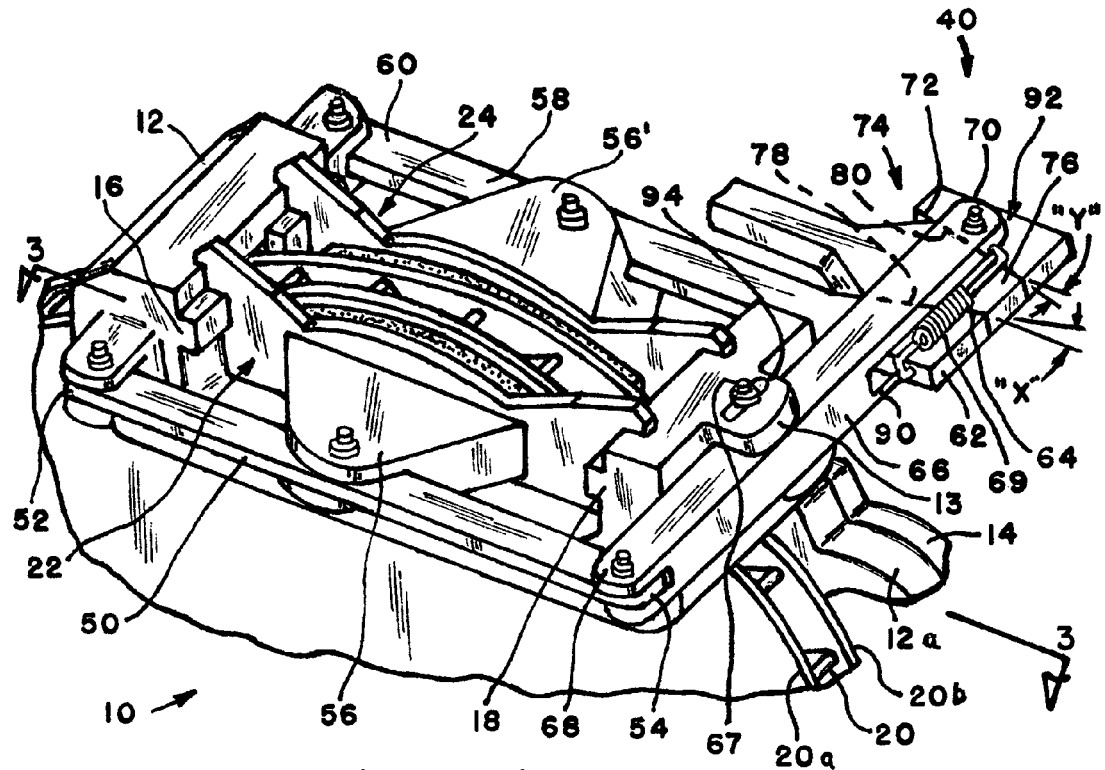
FIG. 1 is a perspective view of a disc brake having an actuator arrangement made according to the principals of the present invention.

A same component when used in another location may be identified by a same reference number in the drawing when possessing a same functional application as initially described in the specification.

Figure 2:
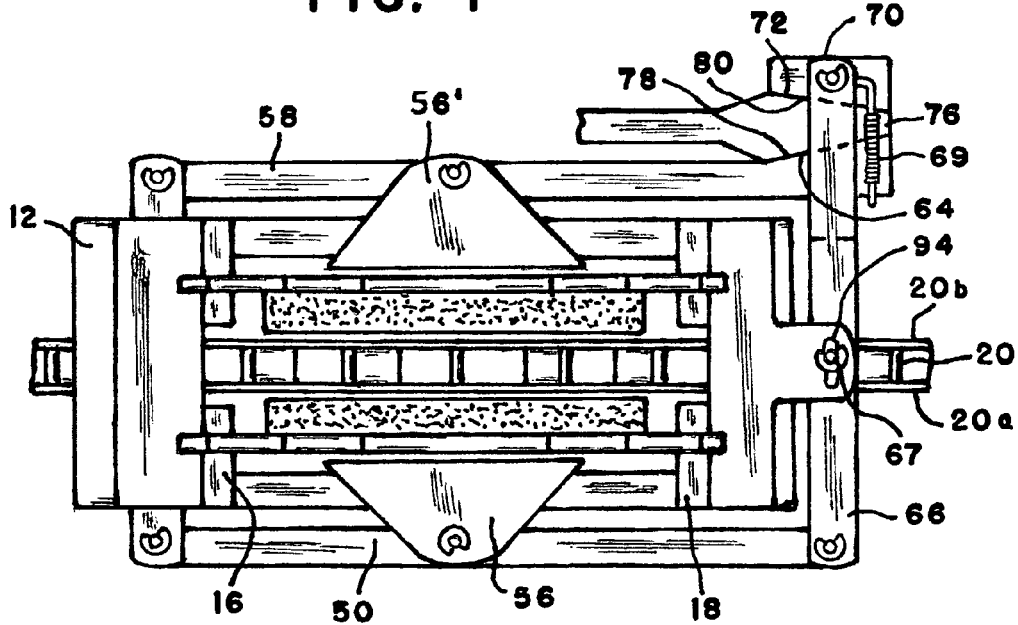
FIG. 2 is a top view of FIG. 1 illustrating the actuator arrangement.
Figure 3:
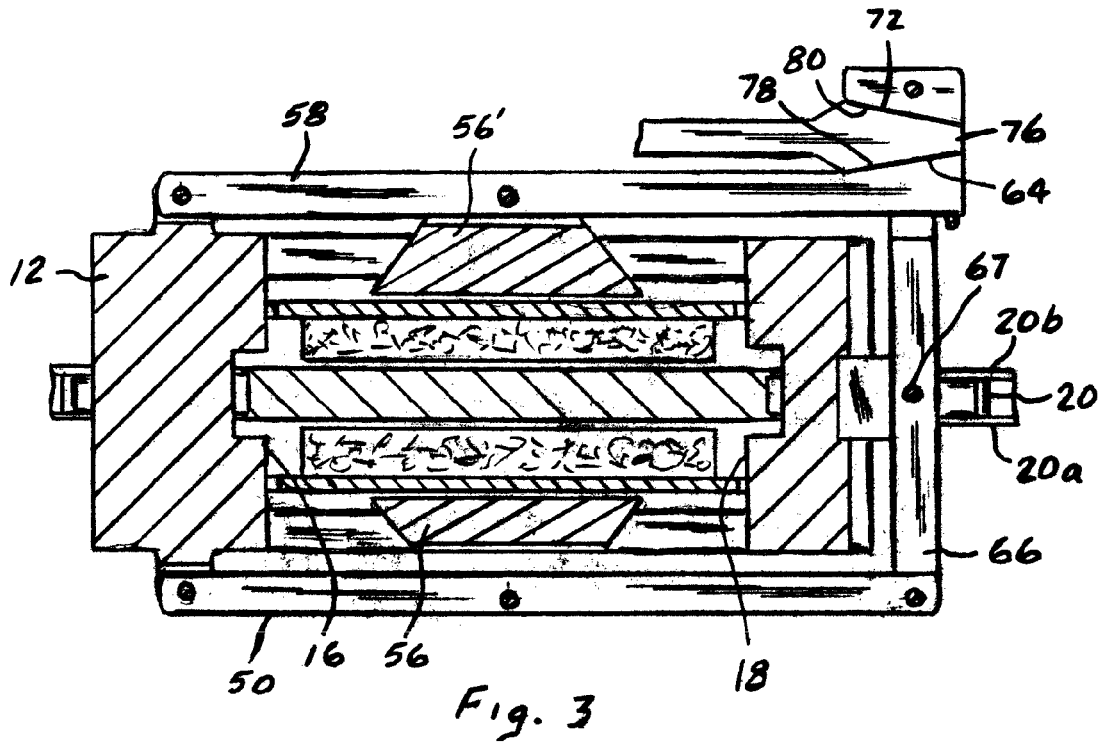
FIG. 3 is a sectional view taken along lines 3-3 of FIG. 1 showing a relationship between the actuator arrangement, first and second friction members, rotor and anchor.
Figure 4:
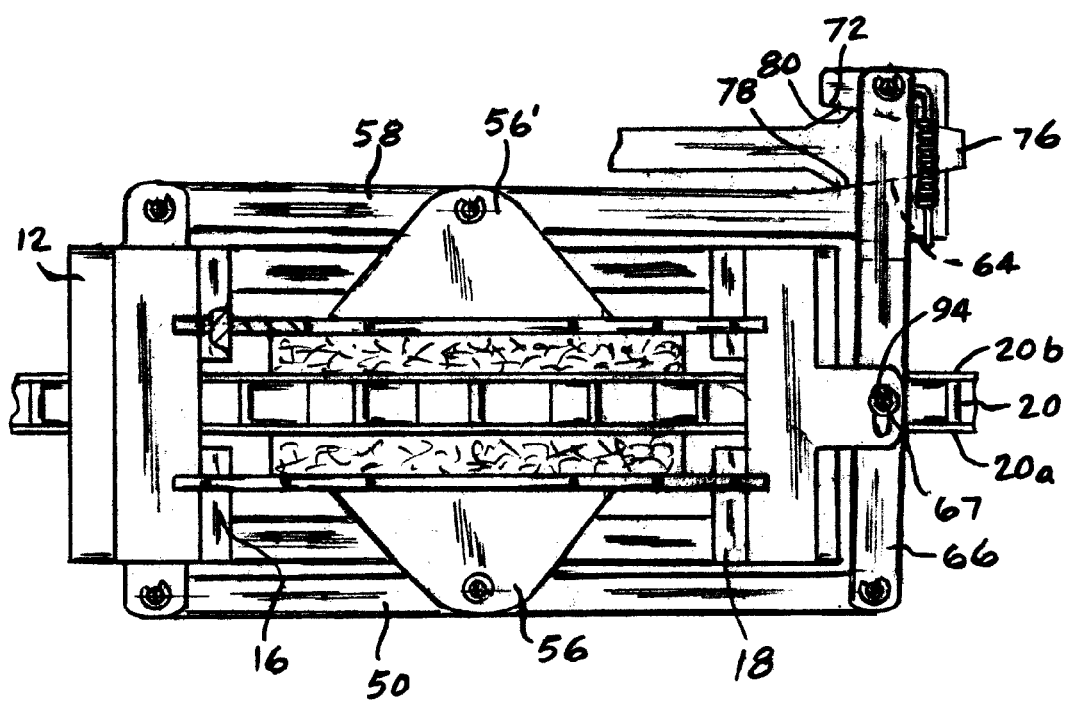
FIG. 4 is a top view of FIG. 1 illustrating the actuator arrangement during a brake application.

The disc brake 10 shown in FIGS. 1, 2 and 3 for a brake system of a vehicle is similar to the prior art such as disclosed in U.S. Pat. No. 5,810,122 in that an anchor 12 that is part of the support member 12a which is fixed to a housing 14 for positioning first 16 and second 18 parallel rails in perpendicular alignment with a rotor 20. A first friction member 22 is retained between the first 16 and second 18 rails and located adjacent a first face 20a of the rotor 20 while a second friction member 24 is retained between the first 16 and second 18 rails and located adjacent a second face 20b of the rotor 20. The first friction member 22 and the second friction member 24 are respectively moved along the first 16 and second 18 rails and into engagement with the first 20a and second 20b faces on the rotor 20 by an input force applied to an actuator arrangement 40 to effect a brake application.

The actuator arrangement 40 is defined by a first lever 50 that has a first end 52 that is pivotally connected to the anchor 12 and a second end 54 that extends along a plane that is substantially perpendicular to the first 16 and second 18 rails for aligning a first contact member 56 with the first friction member 22 and a second lever 58 that has a first end 60 that is pivotally connected to the anchor 12 and a second end 62 that extends along a plane that is substantially perpendicular to the first 16 and second 18 rails for aligning a second contact member 56' with the second friction member 24, the second end 62 of the second lever 58 has a first ramp surface 64 thereon that is aligned in a plane X that extends away from the rotor 20, and a third lever 66 that has a first end 68 that is pivotally connected to the second end 54 of the first lever 50 and a second end 70. The second end 70 of the third lever 66 has a second ramp surface 72 thereon that extends in a plane Y toward the rotor 20. An input linkage 74 defined by a wedge 76 has a first surface 78 thereon that engages the first ramp surface 64 and a second surface 80 that engages the second ramp surface 72 such that an input force applied to input linkage 74 moves the wedge 76 on the first 64 and second 72 ramp surfaces such that the first lever 50 is pulled by the third lever 66 and pivots about its first end 52 to move the first friction member 22 by way of the first contact member 56 into engagement with the first face 20a of the rotor 20 and the second lever 58 is pushed to pivot about its first end 60 to move the second friction member 24 by way of the second contact member 56' into engagement the second face 20b of the rotor 20 to effect a brake application.

The actuator arrangement 40 is define by a first lever 50 that has a first end 52 that is pivotally connected to the anchor 12 and a second end 54 that extends along a plane that is substantially perpendicular to the first 16 and second 18 rails for aligning a first contact member 56 with the first friction member 22 and a second lever 58 that has a first end 60 that is pivotally connected to the anchor 12 and a second end 62 that extends along a plane that is substantially parallel to the first 16 and second 18 rails for aligning a second contact member 56' with the second friction member 24, the second end 62 of the second lever 58 has a first ramp surface 64 thereon that is aligned in a plane X that extends away from the rotor 20, and a third lever 66 that has a first end 68 that is pivotally connected to the second end 54 of the first lever 50 and a second end 70. The second end 70 of the third lever 66 has a second ramp surface 72 thereon that extends in a plane Y toward the rotor 20. An input linkage 74 defined by a wedge 76 has a first surface 78 thereon that engages the first ramp surface 64 and a second surface 80 that engages the second ramp surface 72 such that an input force applied to input linkage 74 moves the wedge 76 on the first 64 and second 72 ramp surfaces such that the first lever 50 is pulled by the third lever 66 and pivots about its first end 52 to move the first friction member 22 by way of the first contact member 56 into engagement with the first face 20a of the rotor 20 and the second lever 58 is pushed to pivot about its first end 60 to move the second friction member 24 by way of the second contact member 56' into engagement the second face 20b of the rotor 20 to effect a brake application.

In more detail, the second end 62 of the second lever 58 is characterized by passing through a first elongated slot 90 defined by yoke 92 on the second end 70 of the third lever 66. The anchor 12 has flange 13 with a slot 94 therein that is parallel with rail 18 to receive a screw 67 that is attached to the third lever 66. The screw 67 on engaging the flange 13 assist in adding stability to the cantilevered second end 54 of the first lever 50 and second end 62 of the second lever 58. In a same manner, wedge 76 also is retained in yoke 92 but may freely move without imparting a force directly into the third lever 66.

The first 56 and second 56' contact members are identical in the embodiment of FIG. 1 each are defined by a single member but in FIG. 5 each are identified by first 55 and second 57 contact pads with the first contact pad 55 being located a first distance from the first end on each of the first 50 and second 58 levers and the second contact pad 57 being located a second distance from the first end on each of the first 50 and second 58 levers. The first contact pad 55 on movement of the first lever 50 toward the first face 20a on the rotor 20 and the second contact pad 55' on movement of the second lever 58 toward the second face 20b on the rotor 20 respectively engaging the first friction member 22 and second friction member 24 prior to the second contact pads 57, 57' respectively engaging the first face 20a and second face 20b. Through this arrangement a more uniform wear pattern on the first 22 and second 24 friction members through engagement with the first 20a and second faces 20b of the rotor 20 may be achieved.

In FIG. 6 the contact member 56 has been eliminated and the backing plate 21 of the friction members 22 and 24 is directly attached to the first lever 50 and second lever 58 such that reaction forces generated during a brake application are carried into the anchor 12 through the first 50 and second 58 levers.

The input linkage 74 as illustrated with respect to FIG. 1 is defined by a wedge 76 but may also be defined by a toggle arrangement as illustrated in FIG. 7 or a cam arrangement as illustrated in FIG. 8.

In the toggle arrangement of FIG. 7, the input linkage 274 includes the first lever 50 that remains the same but the second lever 258 is now defined by a first end that is pivotally attached to anchor 12 and a second end 262 that is aligned in the plane that is perpendicular to the first 16 and second 18 rails, a third lever 166 has a first end pivotally attached to the second end 54 of the first lever 50 and a uniform second end 170 that extends beyond the perpendicular alignment location of the second lever 258, a fourth lever 280 with a first end pivotally connected to the second end 170 of the third lever 166 and a second end 282 and a fifth lever 290 with a first end connected by pin 264 to the second end 262 of the second lever 258 and a second end 292 that is pivotally connected by pin 284 to the second end 282 of the fourth lever 280 to define input linkage 274. An input force applied along a plane perpendicular to the axis of pin 284 causes the first lever 50 to be pulled by the third lever 166 and pivot about its first end 52 to move a first friction member 22 into engagement with the first face 20a of the rotor 20 while the second lever 258 is pushed to pivot about its first end to move the second friction member 24 into engagement the second face 20b of the rotor 20 to effect a brake application. Through the use of this input linkage 274 on termination of an input force a retraction force is applied in the opposite direction and the first 22 and second 24 friction members may be retracted a desired fixed distance from the first 20a and second 20b faces to define a running clearance.

In the cam arrangement of FIG. 8 the input linkage 374 is defined by the first lever 50 and third lever 166 that are similar to that of the toggle arrangement of input linkage 274 but the second lever 358 is now defined by a first end and a second end 354 with a first arcuate cam surface 356 thereon and a fourth lever 376 with a first end 378 pivotally attached by pin 382 to the second end 170 of the third lever 166 and a second end 384 having a second arcuate cam surface 386 thereon that engages the first cam surface 356. An input force applied to the fourth lever 376 causes the fourth lever 376 to pivot about pin 382 and move the second cam surface 386 on the first cam surface 356 causing the first lever 50 to be pulled by the third lever 166 and pivot about its first end 52 to move a first friction member 22 into engagement with the first face 20a of the rotor 20 while the second lever 358 is pushed to pivot about its first end 60 to move the second friction member 24 into engagement the second face 20b of the rotor 20 to effect a brake application.

MODE OF OPERATION

When it is desired to effect a brake application in a vehicle equip with a disc brake 10 as illustrated in FIG. 1, an input force is applied to input linkage 74 causing wedge 76 to slide on ramp surfaces 64 and 72 such the first lever 50 is pulled by the third lever 66 and pivots about its first end 52 to move the first friction member 22 by way of the first contact member 56 into engagement with the first face 20a of the rotor 20 and the second lever 58 is pushed to pivot about its first end 60 to move the second friction member 24 by way of the second contact member 56' into engagement the second face 20b of the rotor 20 to effect a brake application. The first friction member 22 on engagement with the first face 20a and the second friction member 24 on engagement with the second face 20b develop a reaction force that is carried into the anchor 12 to resist rotation of the rotor 20. Since the first 56 and second 56' contact members are not fixed to the first 22 and second 24 friction members movement of first 22 and second 24 friction member toward the anchor 12 by the reaction force is not carried into the first 50 and second levers 58. On termination of the input force on wedge 76, a retraction force developed by spring 69 connected to the second end 62 of the second lever 58 and to the second end 70 of the third lever 66 acts to return the levers to a position of rest. In some instances it may also be desirable to locate a spreader spring between the first 22 and second 24 friction members to assure that a desire running clearance is achieved.

In some instances it may be desirable to fix the first 22 friction member 22 to the first lever 50 and the second friction member 24 to the second lever 58 and thereby eliminate the need for a contact member. In this situation, the function of the levers remains substantially the same but the reaction forces would now be carried through the first end 52 of the first lever 50 and the first end 60 of the second lever 58 during a brake application. It is anticipated that such structure would function in an adequate manner to effect a brake application.

Further in the various embodiment illustrated, a specific source for the development of the input force applied to the input linkage 74 has not been identified but in a preferred embodiment the input force is derived from a hydraulic piston even though it is understood such a force could be applied through an electric winding, air piston or a manual input to effect a brake application.

What is claimed is:

1. A disc brake having an anchor that is fixed to a support member of a vehicle to position first and second parallel rails in perpendicular alignment with a rotor, a first friction member is retained between the first and second rails and located adjacent a first face of the rotor, a second friction member is retained between the first and second rails and located adjacent a second face of the rotor and actuating means for respectively moving the first and second friction members into engagement with the first and second faces on the rotor to effect a brake application, said actuating means being characterized by a first lever having a first end pivotally connected to the anchor and a second end that extends along a plane that is substantially perpendicular to the first and second rails for aligning a first contact member with the first friction member, a second lever having a first end pivotally connected to the anchor and a second end that extends along a plane that is substantially perpendicular to the first and second rails for aligning a second contact member with the second friction member, said second end of said second lever having a first ramp surface thereon that is aligned in a plane that extends away from the rotor, a third lever having a first end pivotally connected to said second end of said first lever and a second end, said second end of said third lever including a yoke through which said second end of said second lever and a wedge which extends through and assists in maintaining said first lever, second lever and third lever in a same plane with respect to the anchor, said wedge engaging said first and second ramp surfaces and responding to an input force by moving on said first and second ramp surfaces such that said first lever is pulled by said third lever and pivots about said first end of said first lever to move the first friction member by way of the first contact member into engagement with the first face of the rotor and said second lever is pushed to pivot about said first end of said second lever to move the second friction member by way of the second contact member into engagement with the second face of the rotor to effect a brake application.

2. The disc brake as recited in claim 1 wherein said wedge moves in said yoke and engages said first and second ramps surfaces without directly imparting a force into the third lever.

3. The disc brake as recited in claim 2 wherein said anchor is further characterized by a flange that is parallel with the second rail, said flange having an elongated slot there through and a screw retained in said elongated slot and fixed to said third lever to assisting in maintaining said third lever in said same plane as said first and second levers.

4. The disc brake as recited in claim 3 wherein said first and second contact members are each defined by first and second contact pads, said first contact pad being aligned a first distance from said first end on each of said first and second levers and said second contact pad being aligned a second distance from said first end on each of said first and second levers, said first contact pad on movement of said first lever toward the first face on the rotor and said second contact pad on movement of the second lever toward the second face on the rotor respectively engaging the first friction member and second friction member prior to said second contact pad to assist in maintaining a uniform wear of the first and second friction members caused through engagement with the first and second faces of the rotor.

5. The disc brake as recited in claim 4 wherein the engagement of said first contact pads and said second contact pads with the first and second friction members allow said first and second friction members to independently move into engagement with the anchor in resisting the braking force created by engagement with the rotor.

6. The disc brake as recited in claim 5 further including resilient means to return the first and second friction members to a position of rest after termination of an input force to said wedge.

7. A disc brake having an anchor fixed to a support member of a vehicle to position first and second parallel rails in perpendicular alignment with a rotor, a first friction member is retained between the first and second rails and located adjacent a first face of the rotor, a second friction member is retained between the first and second rails and located adjacent a second face of the rotor and actuating means for respectively moving the first and second friction members into engagement with the first and second faces on the rotor to effect a brake application, said actuating means being characterized by a first lever having a first end pivotally connected to the anchor and a second end that extends along a plane that is substantially perpendicular to the first and second rails, said first lever being connected to align the first friction member with the first face on the rotor, a second lever having a first end pivotally connected to the anchor and a second end that extends along a plane that is substantially perpendicular to the first and second rails, said second lever being connected to align the second friction member with the second face on the rotor, second end of said second lever having a first ramp surface thereon that is aligned in a plane that extends away from the rotor, a third lever having a first end pivotally connected to said second end of said first lever and a second end, said second end of said third lever having a second ramp surface that extends in a plane toward the rotor, a yoke that extends from said second end of said third lever that engages said first lever and said second lever to maintain said first lever, second lever and third lever in a same plane with respect to the anchor, and a wedge that engages the first and second ramp surfaces and responds to an input force by moving on said first and second ramp surfaces such that said first lever is pulled by the third lever and pivots about said first end of said first lever to move the first friction member into engagement with the first face of the rotor and said second lever is pushed to pivot about said first end of said second lever to move the second friction member into engagement the second face of the rotor to effect a brake application.

8. The disc brake as recited in claim 7 wherein a reaction force created by the engagement with the first and second friction members with the rotor are carried into the anchor through the first and second levers.

9. The disc brake as recited in claim 8 wherein on termination of an input force, a reaction force moves said first lever by pushing on said third lever causing said first lever to pivot about said first end of said first lever to move said first friction member out of engagement with said first face of the rotor and said second lever is pulled and pivots about said first end of said second lever to move said second friction member out of engagement said second face of the rotor to define a running clearance between said first and second friction members and the rotor.

* * * * *